US006961956B2

(12) United States Patent
Bontempi

(10) Patent No.: US 6,961,956 B2
(45) Date of Patent: Nov. 1, 2005

(54) SIMPLIFIED DIGITAL SETTOP BOX

(75) Inventor: Raymond Bontempi, Jamison, PA (US)

(73) Assignee: General Instrument Corporation, Horsham, PA (US)

( * ) Notice: Subject to any disclaimer, the term of this patent is extended or adjusted under 35 U.S.C. 154(b) by 884 days.

(21) Appl. No.: 09/945,975

(22) Filed: Sep. 4, 2001

(65) Prior Publication Data

US 2003/0046713 A1 Mar. 6, 2003

(51) Int. Cl.7 .......................... H04N 7/16; H04N 7/173; H04N 3/27
(52) U.S. Cl. ...................... 725/151; 725/131; 725/139; 348/554
(58) Field of Search ................................. 725/131, 139, 725/151, 133, 141, 153; 348/554, 555

(56) References Cited

U.S. PATENT DOCUMENTS 4,771,456 A    9/1988  Martin et al.
4,926,477 A    5/1990  Paik
5,815,297 A    9/1998  Ciciora
6,226,794 B1 * 5/2001  Anderson et al. ............ 725/131
6,622,308 B1 * 9/2003  Raiser ......................... 725/151

FOREIGN PATENT DOCUMENTS

WO           01/06777        1/2001

* cited by examiner

Primary Examiner—John Miller
Assistant Examiner—Shirley Chang
(74) Attorney, Agent, or Firm—Esteban A. Rockett

(57) ABSTRACT

In order to transition to digital television services, existing analog televisions require additional equipment that can decode received digital data streams. Devices of this sort are readily available, however they can become expensive as the feature list expands. The present invention provides a low-cost digital television settop or the like, with built-in digital decoding and analog signal pass-through capabilities. The tuner within an analog television receives (i) passed through analog television channels and (ii) digital channels that have been converted to analog signals and placed on a predetermined analog television channel.

17 Claims, 3 Drawing Sheets

SIMPLIFIED DIGITAL SETTOP BOX

BACKGROUND OF THE INVENTION

The present invention relates to a low-cost television signal receiver and decoder, hereafter referred to as a "settop", with built-in digital tuning, digital to analog conversion, and analog signal pass-through capabilities. The tuner within an analog television handles analog channel reception, including digital channels presented in analog form on a predetermined analog channel.

While television sets capable of receiving digital signals are becoming more popular, terrestrial television reception by most consumers' TVs is primarily handled in a composite analog format while cable customers often receive a mixture of digital and analog rebroadcast of terrestrial channels. Satellite customers often receive terrestrial channels over the air and digital programming from the satellite. Each analog television channel (whether transmitted "over the air" or on the cable) is transmitted on a 6 MHz channel using NTSC (National Television Standards Committee) format as provided in North America and Japan, or PAL (Phase Alternating Line) as provided in most of Europe. Terrestrial signal reception systems in common use include antennas and cable. With the exception of satellite dish and aerial antenna systems in large metropolitan areas, terrestrial antennas generally limit the number of program providers received by the consumer to a small number. The large channel carrying capacity of broadband cable is a successful alternative. The capacity of the broadband network allows many more channels to be broadcast to customers over copper coaxial cable and/or optical fibers. An analog settop box located at the customer facility tunes and descrambles incoming broadcasts. An example of such an analog settop box is the Impulses® 7000 manufactured by the Broadband Communications Sector of Motorola, Inc., Horsham, Pa., USA. These settop boxes tune to a desired analog frequency and modulate the signal onto an unused channel (usually channel 3 or 4) or provide baseband output. Modern analog televisions often have built in tuners capable of tuning all available analog cable frequencies. However, a settop box is still necessary to descramble scrambled analog broadcasts.

Cable operators have been deploying digital cable service to their customers to provide a wider array of programming and services. Digital cable service offers the advantage of expanded capacity on the transmission medium since up to six video programs can be multiplexed into a 6 MHz bandwidth formerly used for a single analog program. Digital cable can support increased picture quality, such as high definition (HDTV) and service offerings can be expanded as well to include Video on Demand (VOD), Pay Per View (PPV) and interactive shopping. Current generation television systems are beginning to offer digital input and decoding capabilities. However, to maintain backward compatibility with existing analog televisions, service providers offer settop terminals that can decode received digital data programs and output these programs in analog format. Examples include the Motorola Interactive Digital Settop Terminal (DCT-5000, 5100 and 5200) series of units. These units offer digital video, audio, and high speed-data services along with streaming media, PPV, Internet services, HDTV, and personal video recorder (PVR) capabilities. While these feature-rich units permit consumers to access myriad applications, they provide far more functionality than consumers may need for second or third TVs in the home, where simple video viewing of digital and analog programming is all that is required. In particular, the analog hardware in the settop adds substantial additional cost. As a result, there is a need to offer a low-cost settop unit, with simple decode capability, which would allow a consumer to receive digital or analog video program reception. The present invention provides a low-cost settop architecture that leverages existing television tuner hardware in the settop to solve the cost problem.

SUMMARY OF THE INVENTION

Apparatus is provided for processing analog and digital television signals for use by a television appliance. A notch filter filters a predetermined analog television channel frequency from a band of television signals provided as input. A digital receiver is provided to recover a selected digital television signal from said band of television signals. A decryption and decompression processor decodes the digital television signal. An encoder converts the decoded digital television signal into an analog television signal, which is then used to modulate a carrier at the predetermined analog television channel frequency. The analog television signal on the predetermined analog television channel frequency is combined with the filtered band of television signals from the notch filter, for input to the television appliance.

A receiver, such as an infrared (IR) receiver, is provided for receiving remote control channel selections from a user. A remote control transmitter is used to actuate the television appliance to tune to a particular channel in response to a channel selection from the user. If the channel selected is an analog channel, the television appliance is actuated to tune to the analog channel. If the channel selected is a digital channel, the television appliance is actuated to tune to the predetermined analog channel. Additionally, if the channel selected is a digital channel, the digital receiver is actuated to recover that channel for decryption, decompression, analog conversion, and modulation onto the predetermined analog channel. In one embodiment, the predetermined analog channel is one of television channels 3 and 4.

A signal-type detector can be provided to determine whether a channel selected by the user is an analog television signal or a digital television signal. For example, the signal type detector can comprise a channel map lookup capability for determining if the received signal is analog or digital. Alternatively, where the digital signals are transmitted using Quadrature Amplitude Modulation (QAM), the signal type detector can comprise a QAM detection scheme for determining if the received signal is analog or digital.

The remote control transmitter can comprise, for example, an infrared (IR) blaster for actuating a corresponding IR receiver on the television appliance. The apparatus can be incorporated into a set-top box.

Corresponding methods are also provided.

DETAILED DESCRIPTION OF THE INVENTION

The present invention provides an inexpensive digital video settop unit that provides digital signal channel reception for analog television systems over mixed digital and analog cable networks. A distinctive feature of the present invention is that it uses the analog portion of the television receiver for reception of the analog portion of the cable programming. A preferred embodiment is hereafter presented. It should not be construed as a constraint on the use of the disclosed invention, but rather as an example of one use thereof.

Figure 1:
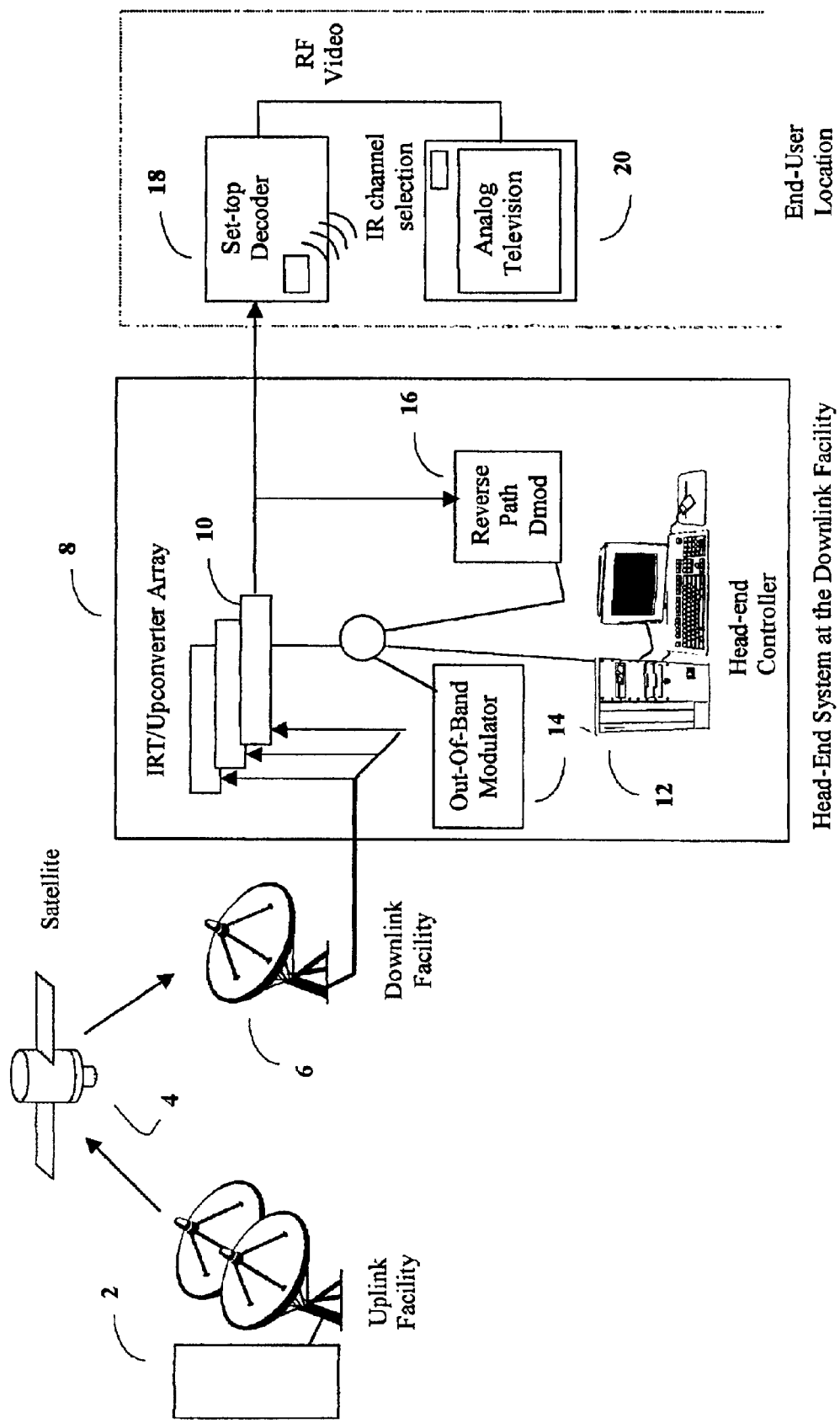
FIG. 1 is a block diagram of transmission and reception equipment for a digital cable television system, including a settop decoder in accordance with the present invention.

For the purpose of the implementation described herein, communication of digital video and audio signals to end-user facilities over digital cable is divided into three operations. The first involves uplink of the digitally encoded services from broadcast service providers to orbital satellites, and downlink of those signals from the satellites to earth-based satellite dish antennas located at cable service provider facilities. The second operation involves manipulating video and audio data at the digital cable provider using head-end equipment at the downlink facility. The third operation involves transmission of digital and analog information to the end-user via a coaxial cable, hybrid optical fiber/cable (HFC) network or the like, and decoding the transmission at the consumers' site. FIG. 1 shows the basic components of the system. At the uplink facility 2, analog and/or digital video and audio signals (e.g., television signals) supplied by broadcast service providers are sampled, quantized, and compressed into representative digital signals. After encryption, these signals are packetized and multiplexed onto intermediate frequency (IF) carrier frequencies and transmitted to a satellite receiver 4. On-board the satellite, a transponder prepares the signals to be broadcast to Earth stations by amplifying those signals and shifting the IF carrier frequency. Signals received by satellite dish antennas 6 at a downlink facility, are shifted to lower IF frequencies and data streams are subsequently decrypted, error-corrected, filtered and modulated to an EIA carrier frequency by head-end equipment 8 at the CATV service provider location. The digital signals are propagated to a population of settop decoders 18 where the signals are decoded, decrypted and demodulated for television viewing at the end-user (e.g., cable subscriber) location.

While the following embodiment deals primarily with reception of broadcast services at the consumer location, system design considerations are described for understanding the context in which the present invention is applied. FIG. 1 shows a typical equipment set-up. The head-end is composed of the following interconnected elements: a plurality of Integrated Receiver Transcoders (IRT), a plurality of Analog Signal Processing Upconverters 10, at least one controller 12, an Out of Band (OOB) Modulator 14, and a Return Path Demodulator (RPD) 16. The array of Integrated Receiver Transcoders (IRT) 10, is responsible for shifting tuned satellite transponder frequencies into Electronics Industry Association (EIA) frequencies that are sent to the end-user. Each IRT downconverts and demodulates the received bitstream, which may comprise, for example, a Quadrature Phase-Shift-Key (QPSK) bitstream and converts it into a more bandwidth efficient signal, such as a Quadrature Amplitude Modulation signal (QAM), as well known in the art. Necessary encryption, decryption, error correction, and service filtering duties are also performed by the IRT. The IRT also provides generation and insertion of broadcast service specific data, including display channel, tier level, purchase constraints, price and rating codes, all as well known. The signals are coupled from the IRT array to an upconverter array 10 that functions to tune the signals output from each IRT to a selectable broadcast (EIA) channel frequency in the range of, e.g., 54–1000 MHz. A configurable channel number identifies each broadcast (EIA) channel.

Each IRT/upconverter pair may be under direct control of a networked head-end controller 12, allowing configuration of key parameters. A Digital Out-of-Band QPSK Modulator 14 as shown, provides additional information to end-users, such as broadcast service guides (e.g., electronic program guides, often referred to as "EPGs"), code downloads for broadcast service access control and application information. A Return Path Demodulator (RPD) 16 functions to receive and demodulate, for example, Pay Per View (PPV) requests from settop decoders 18 at end-user locations.

The settop decoder is the focus of the present invention. The design is modeled after previous generations of digital and analog settop decoders produced by the Broadband Communications Sector of Motorola, Inc., previously General Instrument Corporation, with the exception that the functionality of the device is limited as compared to the full featured models such as the DCT-5000 series settops. The distinguishing feature of the settop decoder of the present invention is that it permits analog tuning of channels to be performed by the analog television receiver in order to reduce the cost of the digital decoder. The present invention is intended for environments where digital programming and analog programming are present, and in situations where the analog portion does not contain scrambled programming to prevent unauthorized viewing of those channels. Prevention of unauthorized use of the digital portion of the transmission is handled by the conditional access module within the settop, as well known in the art.

The settop decoder is installed by connecting an RF cable, carrying both digital and analog programming, to an RF input connector of the settop. Coaxial cable generally serves as the transmission medium for input to the settop device. RF cable is also installed at an output connector of the settop and runs to the RF input connector of the analog television 20. Examples of RF cables output from the settop include coaxial, and S-video (YC).

Figure 2:
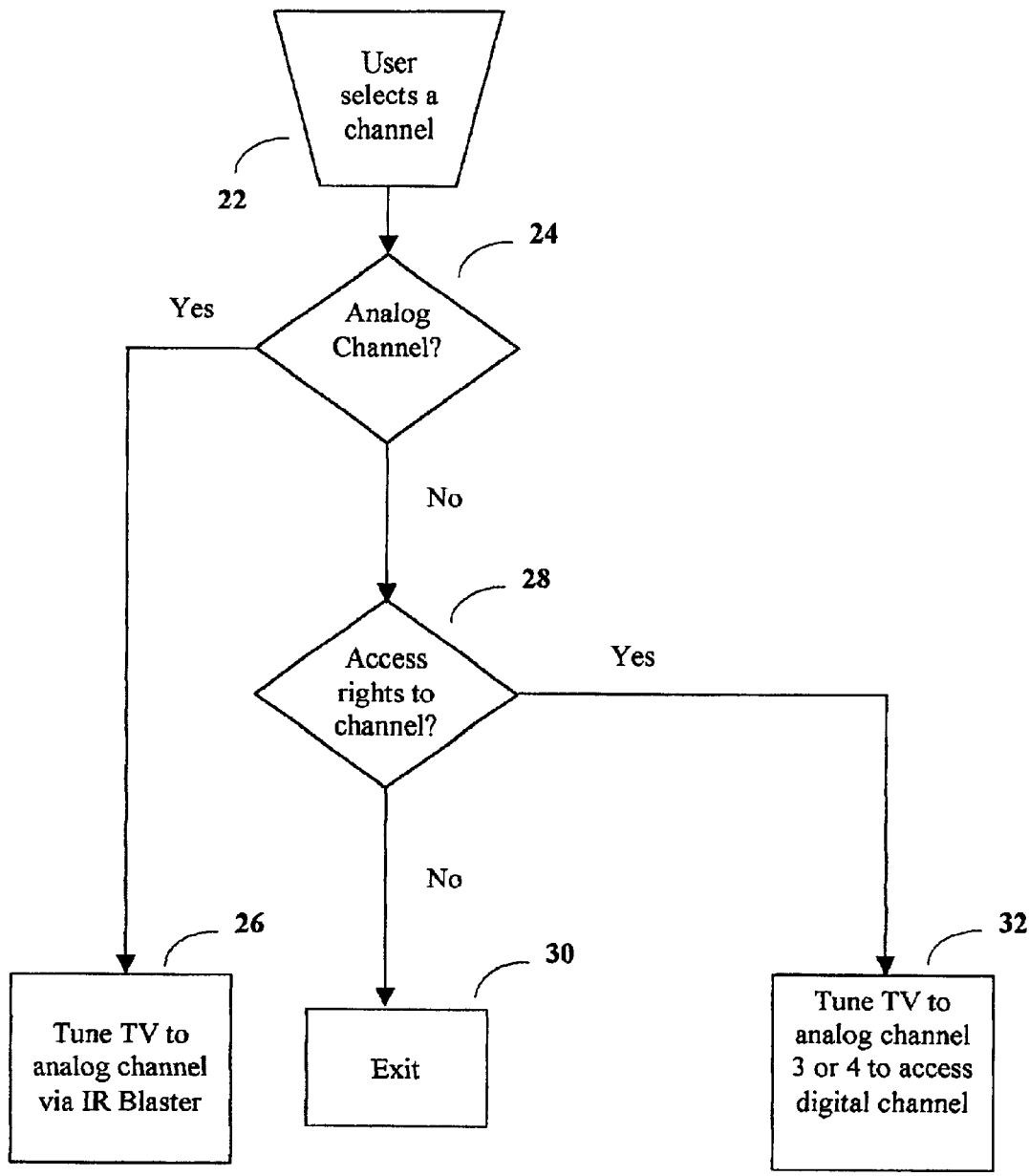
FIG. 2 is a flowchart indicating the operation of a settop in accordance with the invention.

Consumer operation of the settop is designed to be user-friendly, as the selection of digital or analog reception is transparent to the user. A flowchart describing a preferred method for settop operation in accordance with the present invention is shown in FIG. 2. A supplied channel guide allows a user to reference desired broadcast programs and select the corresponding display channel, although this capability is not required in order to make the settop as low-cost as possible. In a very low cost implementation, only channel number (or alphanumeric display) would be displayed on the settop front panel. Following channel selection by the user, as shown in box 22, the settop decides whether the selected channel is analog or digital, box 24, from examination of the channel map or by analysis of digital (e.g., QAM) signal received from the cable service provider. If the selected channel is analog, a transmitter, e.g., an IR blaster, sends a channel selection signal from the settop device to the remote control receiver (e.g., an IR receiver) of the analog television 20. The analog tuner section of the television 20, in response to this signal, tunes the television receiver to the desired frequency, box 26. For digital channel reception, the settop determines whether the user has access rights to the selected channel, box 28. If the user does not have access rights, the procedure exits, as shown in box 30. If the user does have access rights to the channel, the signal is processed (e.g., decompressed, decrypted, and converted to an analog television signal) and the settop modulates the television signal on a predetermined analog television channel, such as channel 3 or 4, as shown in box 32.

Figure 3:
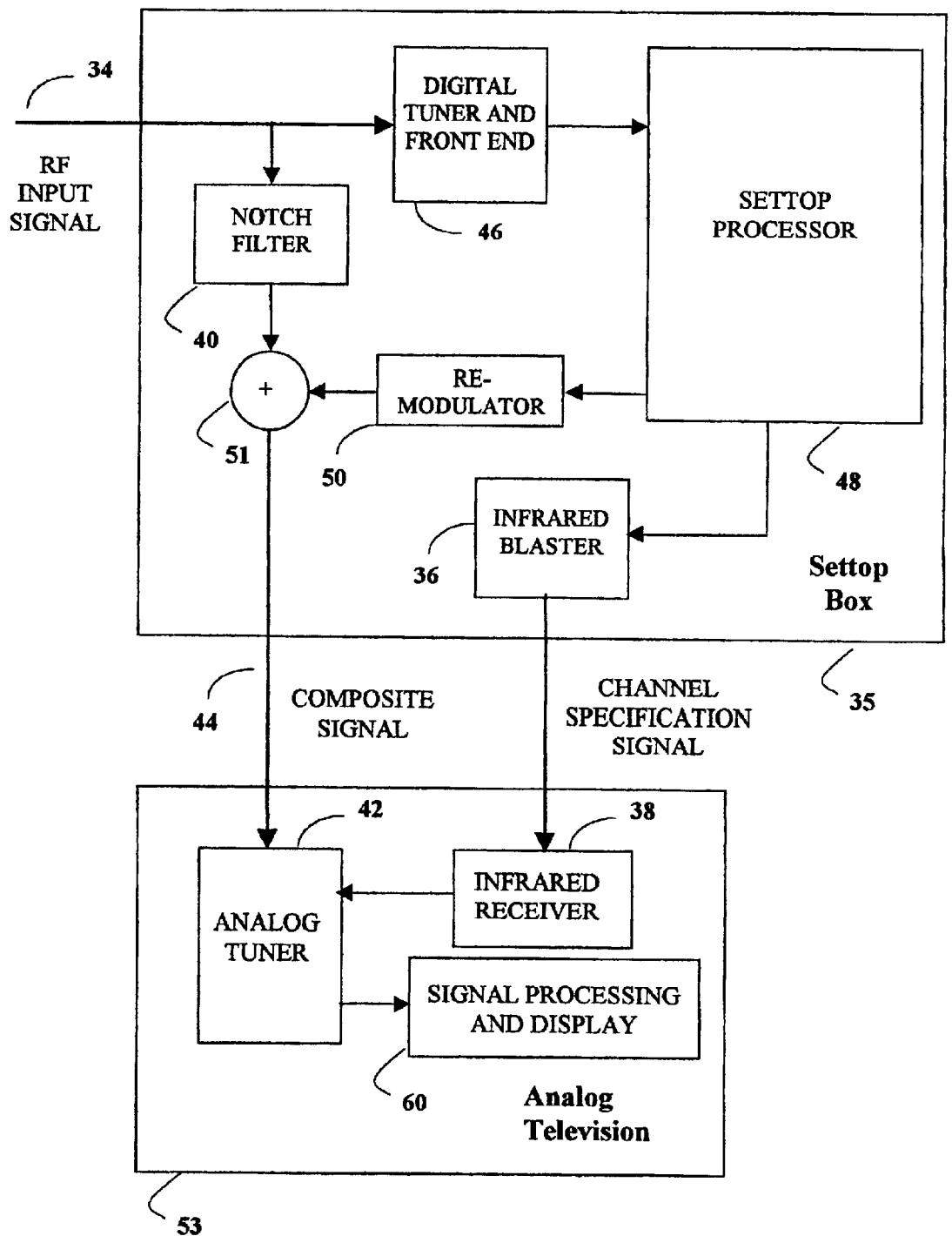
FIG. 3 is a block diagram of the settop showing connections to an analog television.

The design of the settop 35 is shown in FIG. 3. The components that make up such an apparatus include both digital and analog circuits. These components will be described with reference to their operation. Broadcast RF-signals are received by the settop device through the RF input cabling 34. If the tuned channel is determined by the settop processor 48 to be analog, the remote control sending unit 36 within the settop, e.g. IR Blaster, transmits the analog channel specification for this channel to the remote control (e.g., infrared) receiver 38 of analog television 20. Television 20 then tunes to the analog channel for reproduction of the analog television signal by signal processing and display circuitry 60 in a conventional manner. It should be appreciated that the band of analog television signals carried by the RF input signal at input cabling 34 is passed by the settop box to the analog tuner 42 of the television via cable 44, minus the predetermined channel removed by the notch filter 40. As explained below, the removed channel is replaced by the analog equivalent of a digital television signal selected from the RF input signal.

For digital channel reception, a digital tuner 46 of the settop 35 is used for tuning to a desired digital television channel from the band of television signals received by the settop via input 34. Decryption and decompression hardware and associated software are included in the settop processor 48 for decoding the tuned digital signal (e.g. an MPEG-2 television signal), and converting it into an analog television signal. The analog version of the digital signal is then used to modulate the predetermined analog channel carrier frequency that was filtered by notch filter 40 from the band of signals provided at input 34. This is accomplished by a remodulator 50, which passes the modulated carrier to a combiner 51, where the carrier is combined with the filtered band of signals from notch filter 40 for use as input to the analog television 53. It is important to emphasize that the entire process is performed in a manner transparent to the user and is compatible with existing analog television systems.

It should now be understood that the invention provides apparatus and methods for providing an inexpensive digital video settop unit that allows the content of digital signal channels to be received by analog television systems over mixed digital and analog cable networks. A distinctive feature of the present invention is that it uses the analog portion of the television receiver for reception of both analog and digital portions of the cable programming.

Although the invention has been described in connection with a specific embodiment thereof, it should be appreciated that various modifications and adaptations can be made thereto without departing from the scope of the invention, as set forth in the claims.

What is claimed is:

1. Apparatus for processing analog and digital television signals for use by a television appliance, comprising:
    a notch filter for filtering a predetermined analog television channel frequency from a band of television signals input thereto;
    a digital receiver adapted to recover a selected digital television signal from said band of television signals;
    a processor adapted to decode and convert the selected digital television signal into an analog television signal;
    a modulator for providing the analog television signal on said predetermined analog television channel frequency; and
    a combiner for combining the analog television signal on said predetermined analog television channel frequency with the filtered band of television signals from said notch filter for input to said television appliance.

2. Apparatus in accordance with claim 1 further comprising:
    a receiver for receiving remote control channel selections from a user; and
    a remote control transmitter for actuating said television appliance to tune to a particular channel in response to a channel selection from said user;
    wherein:
    if the channel selected is an analog channel, the television appliance is actuated to tune to the analog channel, and
    if the channel selected is a digital channel, the television appliance is actuated to tune to said predetermined analog channel.

3. Apparatus in accordance with claim 2, wherein if the channel selected is a digital channel, the digital receiver is actuated to recover that channel for decoding, analog conversion, and modulation onto said predetermined analog channel.

4. Apparatus in accordance with claim 2 wherein said predetermined analog channel is one of television channels 3 and 4.

5. Apparatus in accordance with claim 2, further comprising a signal-type detector adapted to determine whether a channel selected by the user is an analog television signal or a digital television signal.

6. Apparatus in accordance with claim 5, wherein said signal type detector comprises a channel map lookup capability for determining if the received signal is analog or digital.

7. Apparatus in accordance with 5, wherein said signal type detector comprises a Quadrature Amplitude Modulation (QAM) detection scheme for determining if the received signal is analog or digital.

8. Apparatus in accordance with claim 2, wherein said remote control transmitter comprises an infrared (IR) blaster for actuating an IR receiver on said television appliance.

9. A settop box incorporating the apparatus of claim 1.

10. A method for processing analog and digital television signals for use by a television appliance, comprising:
    filtering a predetermined analog television channel frequency from a band of television signals;
    selectively recovering a digital television signal from said band of television signals;
    decoding said digital television signal,
    converting the decoded digital television signal into an analog television signal,
    modulating said predetermined analog television channel frequency by the analog television signal; and
    combining the analog television signal on said predetermined analog television channel frequency with the filtered band of television signals to provide a composite input signal for said television appliance.

11. A method in accordance with claim 10, further comprising:
    receiving remote control channel selections from a user; and
    actuating said television appliance to tune to a particular channel in response to a channel selection from said user;
    wherein:
    if the channel selected is an analog channel, the television appliance is actuated to tune to the analog channel, and if the channel selected is a digital channel, the television appliance is actuated to tune to said predetermined analog channel.

12. A method in accordance with claim 11, wherein if the channel selected is a digital channel, that channel decoded, converted to analog, and modulated onto said predetermined analog channel.

13. A method in accordance with claim 11 wherein said predetermined analog channel is one of television channels 3 and 4.

14. A method in accordance with claim 11, further comprising determining whether a channel selected by the user is an analog television signal or a digital television signal.

15. A method in accordance with claim 14, wherein said determining step uses a channel map for determining if the received signal is analog or digital.

16. A method in accordance with claim 14, wherein said determining step uses a Quadrature Amplitude Modulation (QAM) detection scheme for determining if the received signal is analog or digital.

17. A method in accordance with claim 11, wherein an infrared (IR) blaster is used to actuate tuning of said television appliance.

* * * * *